US012797812B2

(12) United States Patent
Tung et al.

(10) Patent No.: US 12,797,812 B2
(45) Date of Patent: Nov. 17, 2026

(54) MICROFLUIDIC MIXER FOR ENHANCED THREE-DIMENSIONAL MIXING

(71) Applicant: Academia Sinica, Taipei City (TW)

(72) Inventors: Yi-Chung Tung, New Taipei City (TW); Dao-Ming Chang, Taipei City (TW); Wei-Hao Liao, New Taipei City (TW); Ping-Liang Ko, New Taipei City (TW)

(73) Assignee: Academia Sinica, Taipei City (TW)

( * ) Notice: Subject to any disclaimer, the term of this patent is extended or adjusted under 35 U.S.C. 154(b) by 447 days.

(21) Appl. No.: 18/681,077

(22) PCT Filed: Aug. 11, 2022

(86) PCT No.: PCT/US2022/040018

§ 371 (c)(1),
(2) Date: Feb. 5, 2024

(87) PCT Pub. No.: WO2023/018845

PCT Pub. Date: Feb. 16, 2023

(65) Prior Publication Data

US 2024/0269630 A1 Aug. 15, 2024

Related U.S. Application Data

(60) Provisional application No. 63/232,173, filed on Aug. 12, 2021.

(51) Int. Cl.

| | |
|---|---|
| ***B01F 33/301*** | (2022.01) |
| ***B01F 25/314*** | (2022.01) |
| ***B01F 25/433*** | (2022.01) |

(52) U.S. Cl.

CPC ...... *B01F 33/3017* (2022.01); *B01F 25/3141* (2022.01); *B01F 25/31424* (2022.01); *B01F 25/4331* (2022.01); *B01F 33/301* (2022.01)

(58) Field of Classification Search

CPC ........................... B01F 33/301; B01F 33/3017
USPC .............. 366/181.5, 181.8, 336, 340, DIG. 3
See application file for complete search history.

(56) References Cited

U.S. PATENT DOCUMENTS 4,534,659 A * 8/1985 Dourdeville .......... B01F 25/421 366/338
5,595,712 A * 1/1997 Harbster ............... B01F 25/422 156/290
6,458,325 B1 * 10/2002 Roscher ............... B01J 19/0093 422/68.1
6,935,768 B2 * 8/2005 Lowe ...................... B01F 25/25 366/DIG. 3
7,347,617 B2 * 3/2008 Pugia ................ B01F 35/71725 366/DIG. 3

(Continued)

*Primary Examiner* — David L Sorkin
(74) *Attorney, Agent, or Firm* — NZ Carr Law Office

(57) ABSTRACT

Disclosed herein is a microfluidic mixer comprising first and second input chambers, first and second flow paths, and an output chamber. According to embodiments of the present disclosure, the first input chamber and the output chamber respectively have their bottom surfaces leveled with that of the first and/or second flow paths, while the second input chamber has its bottom surface protruded below that of the first flow path. Also disclosed herein is a microfluidic system comprising the present microfluidic mixer, and a pump for introducing a first and a second fluid reactants respectively into the first and a second input chambers.

7 Claims, 3 Drawing Sheets

(56) References Cited

U.S. PATENT DOCUMENTS

| | | | | |
|---|---|---|---|---|
| 7,435,381 | B2 * | 10/2008 | Pugia | B01L 3/502707 422/502 |
| 8,672,532 | B2 * | 3/2014 | Jovanovich | B01F 33/30 366/181.8 |
| 8,740,448 | B2 * | 6/2014 | Blom | B01F 25/10 366/340 |
| 2002/0023684 | A1 * | 2/2002 | Chow | B01L 3/5027 137/833 |
| 2004/0027915 | A1 * | 2/2004 | Lowe | B01F 25/4338 366/341 |
| 2013/0223182 | A1 * | 8/2013 | Tafti | B01F 33/30 366/338 |

* cited by examiner

10

MICROFLUIDIC MIXER FOR ENHANCED THREE-DIMENSIONAL MIXING

CROSS-REFERENCE TO RELATED APPLICATIONS

This application is a U.S. National Stage Filing under 35 U.S.C. 371 from International Patent Application Serial No. PCT/US2022/40018, filed Aug. 11, 2022, and published on Feb. 16, 2023, which claims the priority of U.S. Provisional Patent Application No. 63/232,173, filed Aug. 12, 2021, the entireties of which are incorporated herein by reference.

BACKGROUND OF THE INVENTION

1. Field of the Invention

The present disclosure relates to a microfluidic mixer for efficiently mixing two fluid reactants by creating a three-dimensional flow upon mixing of the two fluid reactants.

2. Description of Related Art

It has been challenging to perform efficient mixing in microfluidic channels due to its laminar flow nature resulted from their small channel dimensions. Several microfluidic mixers have been developed to promote mixing by introducing unstable chaotic or bifurcation flows. The designs can increase the mass transportation between two input streams to promote the mixing. However, the unstable flow induces relatively high shear stress and shear stress gradient during the transition of the flow patterns that are undesired for many biomedical applications handling precious samples (e.g., cells and nucleotides). In addition, microfluidic channels designed with altered cross-sectional geometries or serpentine channel patterns have also been exploited to introduce the lateral flow for better mixing. The complicated channel designs often require relatively large footprints resulting in high flow resistance that limits their throughput, or they need to be fabricated with higher precision that increase the manufacturing complexity for production.

In view of the foregoing, there exists in the related art a need for a novel microfluidic mixer for fluid processing.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the disclosure is directed to a microfluidic mixer comprising in its structure, a first input chamber, a second input chamber, an output chamber, a first flow path and a second flow path. According to embodiments of the present disclosure, the first and second input chambers are configured to respectively receive first and second fluid reactants; the output chamber is configured to withdraw the product of the first and second fluid reactants; the first flow path is in fluid communication with the first and second input chambers; and the second flow path is in fluid communication with the second input chamber and the output chamber.

In structure, the second input chamber is larger in size than that of the first input chamber, and the first input chamber and the output chamber respectively have their bottom surfaces leveled with that of the first and/or the second flow paths, while the second input chamber has its bottom surface protruded below that of the first flow path, preferably, the second input chamber has its bottom surface protruded below that of the first flow path by a distance that is at least 2-folds of the height of the first flow path, preferably, the distance is about 5-folds of the height of the first flow path. In this case, a three-dimensional flow is initiated in the second input chamber when the first fluid reactant, which is perfused across the first flow path in lateral direction, collides with the second fluid reactant, which is in non-lateral direction (e.g., vertical direction).

According to optional embodiments, the first flow path further comprises a section that diverges into a plurality of fluid conduits independently leading toward the second input chamber.

According to certain optional embodiments, the second flow path comprises a section that forms a plurality of zigzag turns along its length.

The second aspect of the present disclosure is directed to a microfluidic system comprising a microfluidic mixer of the present disclosure, and a pump coupled to the microfluidic mixer. According to some embodiments of the present disclosure, the pump is to introduce the first and second fluid reactants respectively into the first and second input chambers.

Optionally, the microfluidic system further comprises an analyzer coupled to the output chamber.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1A:
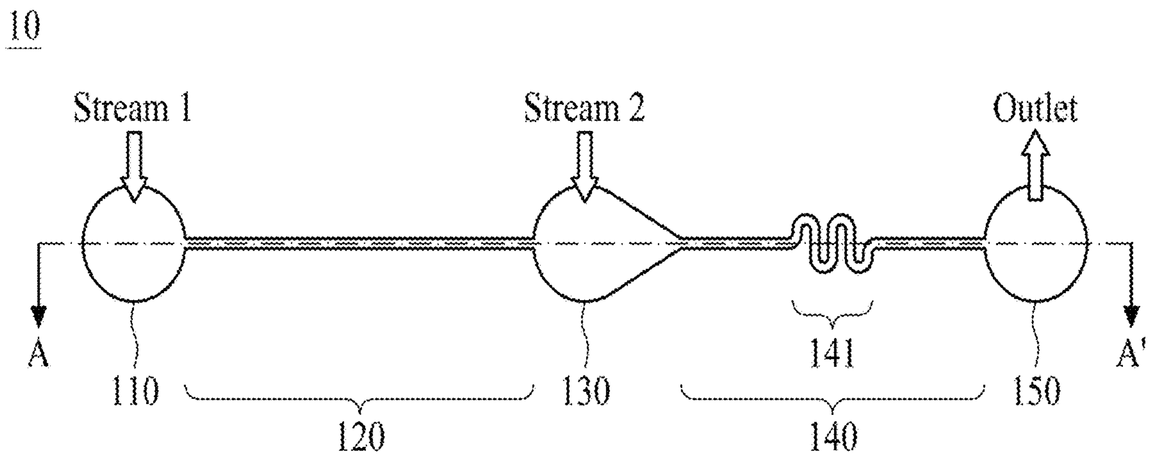
FIG. 1A is a top plan view of a microfluidic mixer 10 according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

As used herein, the term "three-dimensional flow" refers to a transient flow that moves in three-dimensional manner and is resulted from mixing or merging of two streams respectively flow in different directions (e.g., vertical and lateral directions). The three-dimensional movement of the flow provides the ability for the flow to move through multiple planes (i.e., x-y plane, y-z plane, and x-z plane) of a space, simultaneously.

II. Description of the Invention

The present invention is directed to a mixer for mixing two fluid reactants by creating a three-dimensional flow in the mixer that leads to efficient and enhanced mixing of the two fluid reactants. Compared to conventional mixers, the present microfluidic mixer is advantageous in that it provides stable laminar flow thereby eliminating unpredicted excessive shear stress and shear stress gradients that adversely affect fragile samples; has small device footprint and small flow resistance, and is capable of operating in wide Reynolds number range, as well as in having simple microfluidic channel geometry design for easy and cost-effective production.

The first aspect of the present disclosure is thus directed to a microfluidic mixer, which allows two streams of fluids respectively flow in lateral and non-lateral (e.g., vertical) directions to merge into one stream in a space underneath the merged site, thereby creating a three-dimensional flow that leads to efficient and enhanced mixing of the two streams of fluids. The three-dimensional flow introduces a lateral momentum to the two streams of fluids thereby enhancing the mixing of the two streams via increasing the mass transportation as well as decreasing the diffusion length. Further, the merged stream inside the present mixer is laminar and stable (i.e., without unpredicted transient flows); therefore, the shear stress and its gradients can be accurately and directly estimated.

FIG. 1A depicts a microfluidic mixer 10 that includes in its structure, a first input chamber 110, a second input chamber 130, an output chamber 150, a first flow path 120, and a second flow path 140, in which the first and second input chambers 110, 130 are interconnected by the first flow path 120, while the second input chamber 130 and the output chamber 150 are interconnected by the second flow path 140.

Figure 1B:
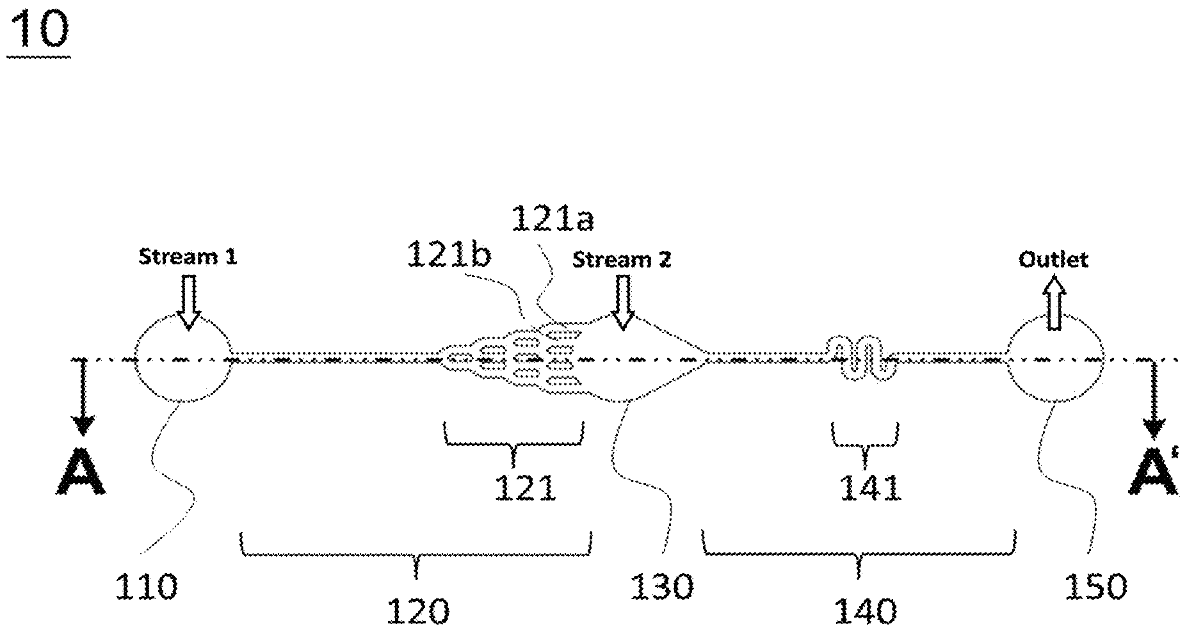
FIG. 1B is a top plan view of the microfluidic mixer 10 according to another embodiment of the present disclosure.
Figure 1C:
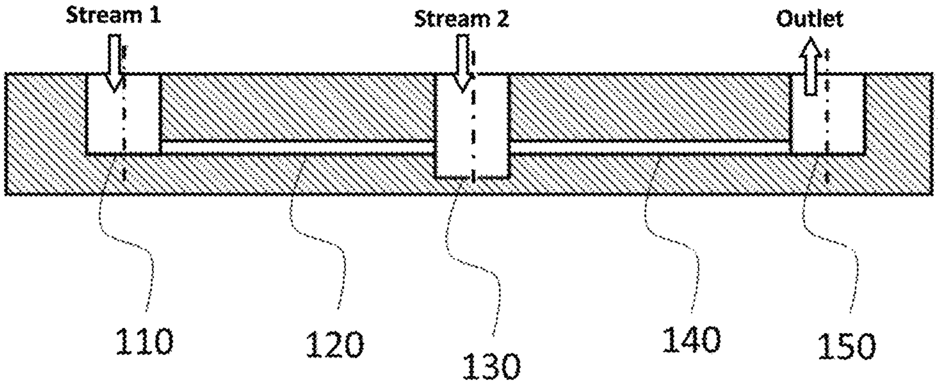
FIG. 1C is a sectional view of the microfluid mixer 10 of FIG. 1B along the line A-A'.
Figure 1D:
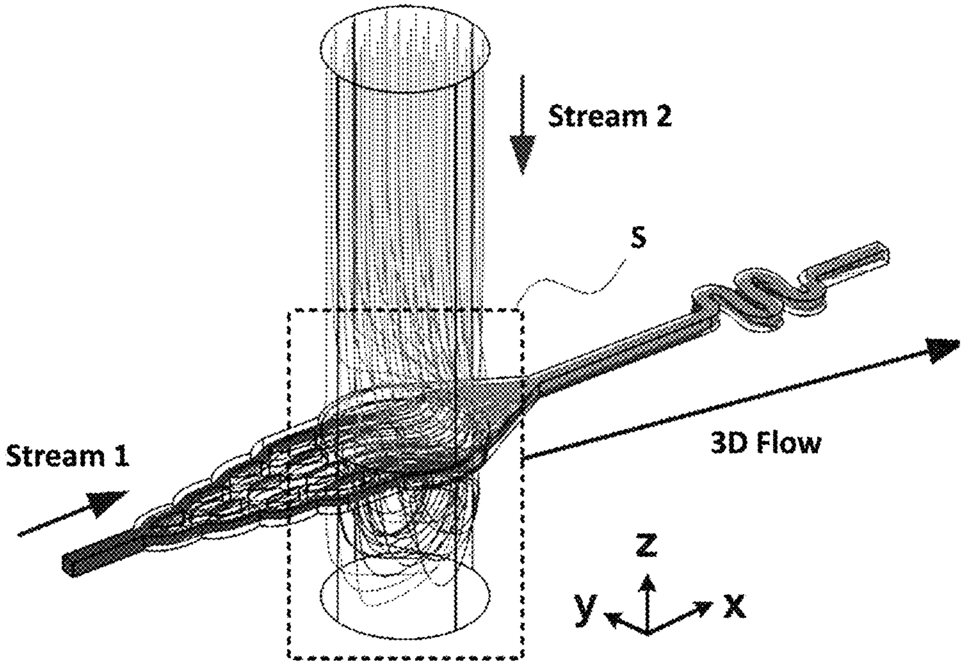
FIG. 1D is a perspective view of the three-dimensional flow formed upon colliding of the first and second fluid reactants (i.e., streams 1 and 2) respectively flow in lateral and vertical directions according to one embodiment of the present disclosure.
Figure 1E:
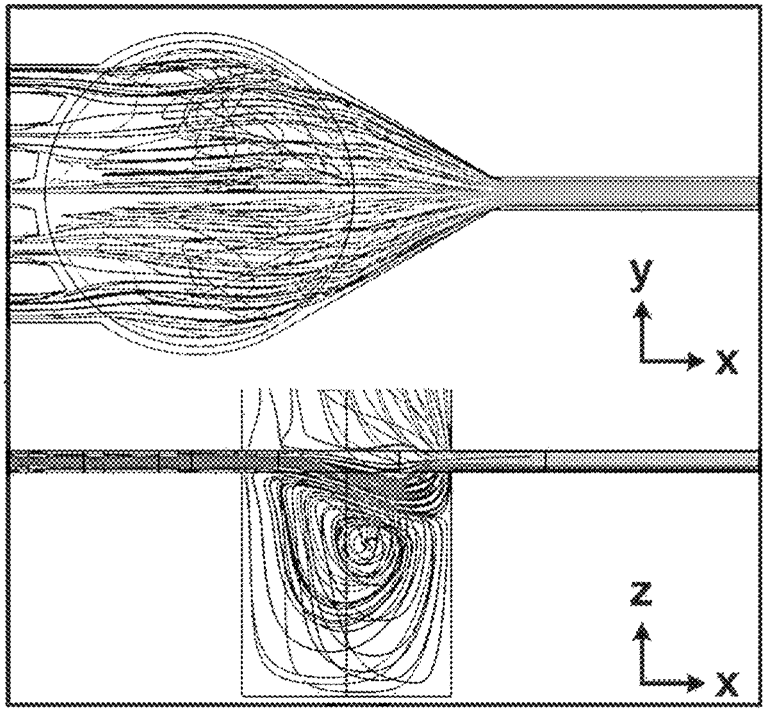
FIG. 1E depicts the numerical simulation results of the three-dimensional stream lines in the microfluidic mixer 10 according to one embodiment of the present disclosure.

Note that for easily accessing the contents in the input and/or output chambers, each chamber of the microfluidic mixer 10 is designed to be open on the top; thus, when in operation, first and second fluid reactants (respectively denoted as streams 1 and 2 in FIGS. 1A to 1D) are directly fed into the first and second input chambers 110, 130, and the reaction product of the first and second reactants may be directly withdrawn from the output chamber 150 through their respective top openings. According to some preferred embodiments of the present disclosure, the first and second fluid reactants are independently fed into the first and second chambers 110, 130 continuously with the aid of a pump, such as a peristatic pump, a syringe pump and the like. Note that for the sake of brevity, the pump is not depicted in the figure. The first reactant (i.e., stream 1), upon entering the input chamber 110, will flow through or perfuse across the first flow path 120 and collide with the vertical stream of the second fluid reactant (i.e., stream 2) fed through the top opening of the second input chamber 130, thereby creates a three-dimensional flow when the first and second fluid reactants meet and collide in the second input chamber 130. Alternatively or optionally, the first flow path 120 comprises a section 121 that diverges into a plurality of fluid conduits (i.e., 121*a*, 121*b*, and etc), with each fluid conduits independently leading toward the second input chamber 130 and connecting thereto, thereby creating a plurality of parallel streams of the first fluid reactant in the first flow path 120 (FIG. 1B) In some embodiments, the section 121 of the first flow path 120 diverges into 2, 3, 4, 5, or 6 parallel fluid conduits. The plurality of parallel streams of the first fluid reactant flow in lateral direction in the plurality of parallel fluid conduits 121*a*, 121*b*, and etc. eventually reach the second input chamber 130, and collide with the stream of the second fluid reactant (i.e., stream 2) fed through the top opening of the second input chamber 130, thereby creates a three-dimensional flow when the first and second fluid reactants meet and collide in the second input chamber 130 (FIG. 1C). According to embodiments of the present disclosure, the second fluid reactant stream (i.e., stream 2) fed through the top opening of the second input chamber 130 may be in any direction except lateral direction (i.e., except the direction that is parallel with the first reactant stream). The second fluid reactant stream fed through the top opening of the second input chamber 130 may come into the second input chamber 130 from any non-parallel direction, thus will collide with the first fluid reactant stream at an angle between 5 to 175 degrees, such as 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174 and 175 degrees; preferably, at the angle of 90 degrees. To accommodate the thus created three-dimensional flow, which allows for a complete and thorough mixing of the first and second fluid reactants, the second input chamber 130 is designed to be relatively larger in size than that of the first input chamber 110 (i.e., the total volume the second input chamber 130 is larger than that of the first input chamber 110. To this purpose, the second input chamber 130 is characterized in having its bottom not leveled with that of the first input chamber 110, nor with the first and the second flow paths 120, 140. Referring to FIG. 1C, which is a sectional view of the microfluid mixer 10 of FIG. 1A or 1B along the line A-A'. As illustrated, the second input chamber 130 is relatively larger in size than that of the first input chamber 110; in which the bottom of the second input chamber 130 is protruded below that of the first input chamber 110, as well as below the first and the second flow paths 120, 140. In some preferred embodiments, the bottom surface of the second input chamber 130 is protruded below that of the first flow path 120 by a distance at least 2-folds of the height of the first flow path, such as 2, 3, 4, and 5-folds of the height of the first flow path. In certain embodiments, the bottom surface of the second input chamber 130 is protruded below that of the first flow path 120 by about 2 mm. By this arrangement, the second input chamber 130 may provide room or space (denoted as "S" in FIG. 1D) to accommodate the three-dimensional flow created upon colliding of the plurality of parallel streams of the first fluid reactant in lateral direction and the stream of the second fluid reactant in vertical direction. According to the numerical simulation results as depicted in FIG. 1E, the three-dimensional flow would introduce a lateral momentum to the two streams of first and second fluid reactants (i.e., streams 1 and 2) thereby increases the mass transportation and reduces the diffusion length between the two reactant streams.

According to preferred embodiments of the present disclosure, the present microfluidic mixer 10 is suitable for mixing streams having a Reynolds number ranging from 0.001 to 1,000, such as 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975 or 1,000; more preferably from 0.003 to 300, such as 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290 or 300.

The reaction product of the first and second fluid reactants and/or the non-reacted first and second fluid reactants will keep flowing through the present microfluidic mixer 10, passing the second flow path 140 and arriving at the output chamber 150, eventually are withdrawn thereout via use of a pump (e.g., peristatic pump, a syringe pump and the like). Additionally or optionally, the second flow path 140 comprises a section 141 that forms a plurality of zigzag turns along its length (FIG. 1A). According to some embodiments of the present disclosure, the plurality of zigzag turns are configured to further enhance the mixing of the non-reacted first and second fluid reactants in the direction of X-Y plan. As could be appreciated, the zigzag turns may be replaced by other geometric designs for the mixing purpose, for example, one or more wave-shaped sections, V-shaped sections, U-shaped sections, spiral-shaped sections, and the like. Note that for the purpose of small device footprint, the first and second flow paths 120, 140 depicted in FIGS. 1A to 1C are designed to be as short as possible provided that thorough mixing has been achieved.

According to certain embodiments, the present microfluidic mixer is made of a material selected from the group consisting of, glass, metal, plastic, ceramic and the like. Non-limiting examples of glass suitable for making the present microfluidic mixer include silicon dioxide, sodium carbonate, borosilicate, aluminosilicate, and the like. Non-limiting examples of metal suitable for making the present microfluidic mixer include steel, aluminum, aluminum alloy, and the like. Non-limiting examples of plastic suitable for making the present microfluidic mixer include ethylene propylene diene monomer (EPDM), fluorinated ethylene-propylene (FEP), high-density polyethylene (HDPE), low-density polyethylene (LDPE), polyamide (PA), polycarbonate (PC), polyethyleneterephthalate (PETG), perfluoroalkoxy (PFA), polymethylpentene (PMP), polypropylene (PP), polystyrene (PS), polysulfone (PSU), polytetrafluoroethylene (PETF), polyvinylchlorid (PVC), polyvinylidenfluoride (PVDF), styrene-acrylnitrile (SAN), silicone rubber (SI), cyclo-olefin copolymer (COC) and a combination thereof.

Additionally or optionally, the microfluidic mixer may further include an analyzer coupled to the output chamber of the microfluidic mixer so as to provide real-time monitoring and evaluating the product of the first and second fluid reactants. The analyzer may be any device or apparatus known in the art for determining the mixing efficiency, for example, laser doppler anemometry (LDA, also known as laser doppler velocimetry (LDV)), positron emission particle tracking (PEPT), magnetic resonance imaging (MRI), infrared analyzer, or a combination thereof.

Example 1 Construction and Testing of the Present Microfluidic Mixer

For the purpose of evaluating the mixing efficacy of the present microfluidic mixer, fluorescein and water were respectively subjected to the first and second input chambers. Specifically, both the fluorescein and water were introduced into the mixer at the flow rate of 1 ml/min.

Figure 2:
FIG. 2 is a photograph depicting the flows of fluorescein solution (stream 1) and water (stream 2) in the microfluidic mixer 10 according to another embodiment of the present disclosure.

The data in FIG. 2 demonstrated that the fluorescein (stream 1) and water (stream 2) are well mixed in the outlet flow.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A microfluidic mixer comprising:

first and second input chambers respectively for receiving first and second fluid reactants;

an output chamber for withdrawing the product of the first and second fluid reactants;

a first flow path interconnecting the first and second input chambers; and a second flow path interconnecting the second input chamber and the output chamber;

wherein, the first and second input chambers respectively have open tops allowing the first and second fluid reactants to be fed from their respective open tops;

the second input chamber is larger in size than that of the first input chamber, the first and second flow paths are disposed on the same elevation;

the first input chamber and the output chamber respectively have their bottom surfaces leveled with that of the first and/or the second flow paths, while the second input chamber has its bottom surface protruded below that of the first flow path; and a three-dimensional flow is created in the second input chamber when the first fluid reactant perfused across the first flow path in lateral direction collides with the second fluid reactant, which is in a non-lateral direction.

2. The microfluidic mixer of claim 1, wherein the first flow path comprises a section that diverges into a plurality of fluid conduits independently leading toward the second input chamber.

3. The microfluidic mixer of claim 1, wherein the second input chamber has its bottom surface protruded below that of the first and/or second flow paths by a distance that is at least 2-folds of the height of the first or second flow paths.

4. The microfluidic mixer of claim 3, wherein the second input chamber has its bottom surface protruded below that of the first and/or second flow paths by a distance that is about 5-folds of the height of the first or second flow paths.

5. The microfluidic mixer of claim 1, wherein the second flow path comprises a section that forms a plurality of zigzag turns along its length.

6. A microfluidic system comprising the microfluidic mixer of claim 1 and a pump, wherein the pump is coupled to the microfluidic mixer of claim 1 and is configured to introduce the first and second fluid reactants respectively into the first and second input chambers.

7. The fluid system of claim 6, further comprising an analyzer coupled to the output chamber.

* * * * *